UNITED STATES PATENT OFFICE.

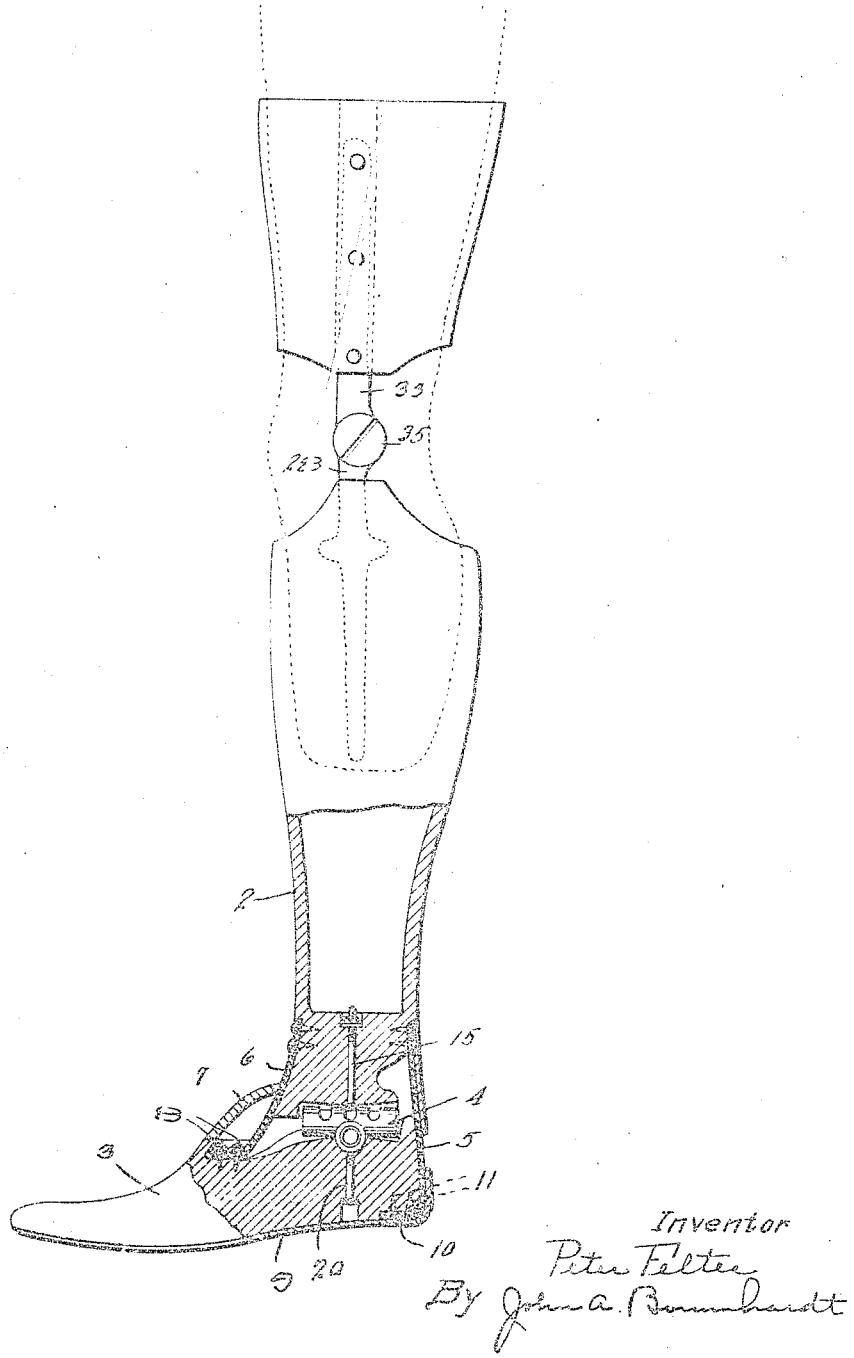

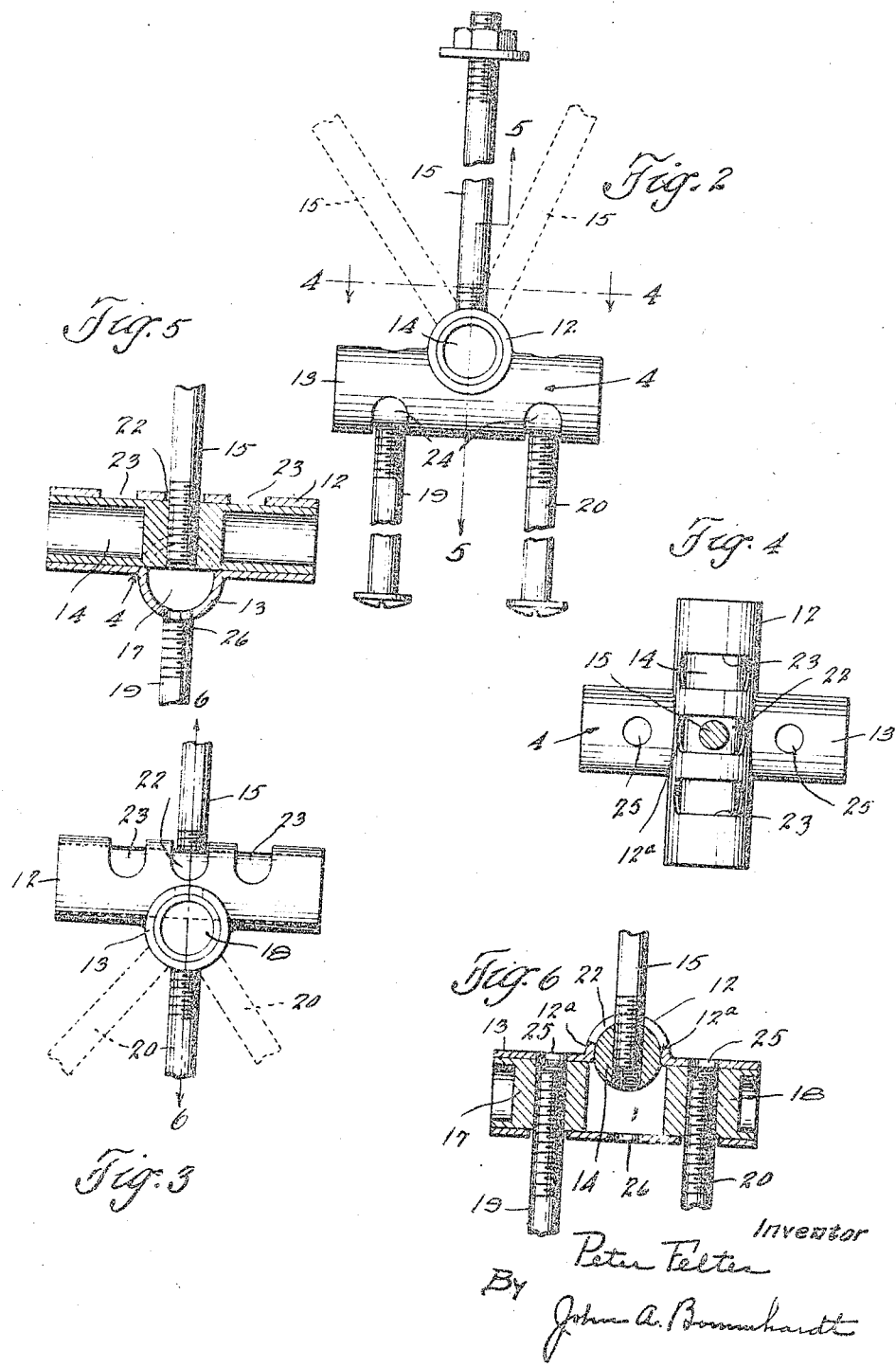

PETER FELTES, OF CLEVELAND, OHIO.

ARTIFICIAL LIMB.

1,224,368.  Specification of Letters Patent.  Patented May 1, 1917.

Application filed January 12, 1917. Serial No. 141,919.

*To all whom it may concern:*

Be it known that I, PETER FELTES, a citizen of the United States, residing at Cleveland, in the county of Cuyahoga and State of Ohio, have invented certain new and useful Improvements in Artificial Limbs, of which the following is a specification.

This invention relates to artificial limbs, and has particular reference to the joints thereof, especially the ankle joint. It has for its principal object to dispense with the use of all springs, cords, and with as little elastic or similar material as possible, without impairing the flexibility of the joints.

The ankle joint provides pivotal movement in the line of progression of the wearer, as well as a lateral pivotal movement, and one or both of these movements may be prevented by a locking device, if required by local conditions.

In the accompanying drawings—

Figure 1 is a side elevation of an artificial leg, partly in section, showing the knee and ankle joints.

Fig. 2 is a rear elevation of the ankle joint.

Fig. 3 is a side elevation thereof.

Fig. 4 is a section on the line 4—4 of Fig. 2.

Fig. 5 is a section on the line 5—5 of the same figure.

Fig. 6 is a section on the line 6—6 of Fig. 3.

In the drawings, 2 indicates the lower or calf section of the leg and 3 the foot, these members being held together by the joint indicated as a whole at 4, and the elastic strips 5 and 6 at front and back. The foot has a removable cover or instep piece 7, which may be removed to give access to the screws 8 by which the lower end of the strip 6 is fastened to the foot. The foot has a leather sole piece 9 which covers the screws 11 by which the strip 5 is attached at the heel, and this sole piece may be removed to give access to the screws 11 and to the bolts 19 and 20 which form a part of the joint 4.

Said joint comprises a casing having tubular parts 12 and 13 arranged in cross relation, the tube 13 extending cross-wise and the tube 12 lengthwise of the joint. Mounted to turn in the upper tube 12 is a block or bushing 14 from which projects upwardly a bolt 15 by which the joint is secured to the leg member, the nut on the bolt being accessible inside the leg; and the bushing 14 permits lateral or sidewise movement, as indicated in dotted lines in Fig. 2, the limit of this movement being determined by the stops 12ª at the end of a slot 22 in which the bolt 15 swings. Openings 23 are also provided to lighten the parts and permit lubrication.

The lower member 13 of the joint casing has therein two bushings or turning blocks 17 and 18, at opposite ends thereof, and a pair of bolts 19 and 20 are tapped into these blocks, and serve to connect the foot 3 to the joint, and to permit direct flexion or movement of the foot, as indicated in dotted lines in Fig. 3, this movement being limited by the length of the slots 24 in which the bolts move.

The upper part of the tube 13 is provided with holes 25, in line with the bolts 19 and 20. If it is desired to lock the joint to prevent direct movement of the foot, it may be done by screwing the bolts 19 and 20 into the holes 25, so that flexion on the cross axis is prevented. In a similar manner flexion on the other axis may be prevented by screwing the bolt 15 down into a similar hole 26 in the joint casing. These locking functions enable a user to suit himself as to the movement desired.

I claim:

1. A joint for artificial limbs, comprising a casing having two tubular members at an angle to each other, each of said members having a slot on one side thereof and a hole on the opposite side, a block mounted to turn in each member, and a bolt extending through the slot and each block and adapted to be shifted into the hole to lock the block.

2. A joint for artificial limbs or the like, comprising a casing having two tubular parts at an angle to each other, a block mounted to turn in each tubular part, and a connection secured to each block adapted for attachment to a limb member, and means to lock each block to the casing.

3. A joint for artificial limbs, comprising a casing having tubular parts at an angle to each other, a block mounted to turn in one of said parts, and a pair of blocks mounted to turn in opposite ends of the other of said parts, each of said blocks having a projecting device for connection to a member of the limb.

In testimony whereof, I do affix my signature in presence of two witnesses.

PETER FELTES.

Witnesses:
 FRANK L. FELTES,
 JOHN A. BOMMHARDT.